US009587750B2

(12) United States Patent
Ringer et al.

(10) Patent No.: US 9,587,750 B2
(45) Date of Patent: Mar. 7, 2017

(54) FLUID CONTROL VALVE SYSTEM AND METHODS

(71) Applicant: TYCO FIRE PRODUCTS LP, Lansdale, PA (US)

(72) Inventors: Yoram Ringer, Providence, RI (US); Su Yang, Providence, RI (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 14/214,294

(22) Filed: Mar. 14, 2014

(65) Prior Publication Data

US 2014/0264104 A1    Sep. 18, 2014

Related U.S. Application Data

(60) Provisional application No. 61/793,270, filed on Mar. 15, 2013.

(51) Int. Cl.
| | |
|---|---|
| *F16K 31/126* | (2006.01) |
| *F16K 7/12* | (2006.01) |
| *A62C 35/68* | (2006.01) |
| *F16K 27/02* | (2006.01) |

(52) U.S. Cl.
CPC ............ *F16K 7/126* (2013.01); *A62C 35/68* (2013.01); *F16K 27/0236* (2013.01); *F16K 31/1266* (2013.01)

(58) Field of Classification Search
CPC .. F16K 31/1266; F16K 27/0236; F16K 7/126; A62C 35/68

USPC .......... 251/61.1, 331, 61, 337; 137/488, 489, 137/489.5, 492.5; 267/161
See application file for complete search history.

(56) References Cited

U.S. PATENT DOCUMENTS

| | | | | |
|---|---|---|---|---|
| 3,302,662 A * | 2/1967 | Webb | ................... | F16K 15/046 137/539 |
| 3,802,462 A * | 4/1974 | Trosch | ................... | F16K 7/126 137/556 |
| 4,356,980 A * | 11/1982 | Krauss | ................ | F02M 51/065 239/585.3 |
| 5,706,859 A * | 1/1998 | Backlund | ............. | F16K 11/022 137/606 |
| 6,095,484 A | 8/2000 | Frenkel | | |
| 7,059,578 B2 | 6/2006 | Frenkel | | |
| 8,096,319 B2 * | 1/2012 | Beck | ................... | F16K 15/046 137/543.19 |
| 8,616,234 B2 * | 12/2013 | Ringer | ................... | F16K 7/126 137/489.5 |
| 2010/0071776 A1 * | 3/2010 | Ringer | ................... | F16K 7/126 137/12 |

FOREIGN PATENT DOCUMENTS

EP    0 928 917 B1    4/2002

* cited by examiner

*Primary Examiner* — Craig Schneider
*Assistant Examiner* — Andrew J Rost
(74) *Attorney, Agent, or Firm* — Perkins Coie LLP

(57) ABSTRACT

A diaphragm-type control valve having a valve body holding a diaphragm and a depression member is provided preferably for use in the separation of and fluid control between a fluid source and a pressurized gas volume. An inner surface of the valve body defines a chamber having an inlet and an outlet in communication with the chamber, and an elongated seat member. The depression member biases the diaphragm to a seated position within the valve.

27 Claims, 13 Drawing Sheets

FLUID CONTROL VALVE SYSTEM AND METHODS

PRIORITY DATA

This application claims the benefit of U.S. Provisional Application No. 61/793,270, filed Mar. 15, 2013, which application is incorporated herein by reference in its entirety.

FIELD OF INVENTION

This invention relates generally to valves and the control of water supply systems. More specifically, the invention is directed to valves using a diaphragm to control flow through the valve, and the formation of a seal within the valve.

BACKGROUND OF THE INVENTION

Diaphragm-type fluid control valves can provide controlled fluid separation and flow along a pipe-line, manifold or other piping network. Generally, the diaphragm-type valve includes a flexible diaphragm element molded from an elastomeric material to control fluid flow between the inlet and the outlet of the valve body. More specifically, in known diaphragm-type valves, the diaphragm element engages a seat formed within the valve body to separate the interior chamber of the valve body into three parts: (i) an inlet chamber which can hold the supply fluid, (ii) an outlet chamber which receives fluid from the inlet chamber for discharge out the outlet and (iii) a diaphragm chamber which can hold a fluid under pressure to urge and maintain the diaphragm element in the seated position. Upon release of fluid pressure from the diaphragm chamber, the diaphragm element can be displaced from the seated position by the pressure of fluid in the inlet chamber and fluid flow is permitted between the inlet and the outlet chambers. Known diaphragm elements and diaphragm-type control valves are shown and described in European Patent Application No. EP 0928917; U.S. Pat. No. 6,095,484; U.S. Pat. No. 7,059,578; and U.S. Pat. No. 8,616,234. The known diaphragm elements show and describe structures formed with the diaphragm elements to facilitate seating of the diaphragm element within the valve body. For example, U.S. Pat. No. 6,095,484 shows and describes a diaphragm element formed with a central ring and radially extending springy ribs to facilitate seating of the diaphragm element. U.S. Pat. Nos. 7,059,578 and 8,616,234 show and describe a diaphragm element formed with the radially arranged ribs and a ring element which facilitate seating of the diaphragm element. The seating structures can add to the complexity of forming or molding the diaphragm element.

SUMMARY OF THE INVENTION

Preferred embodiments of a diaphragm-type control valve include a preferred diaphragm element and a separate depression member which engages the diaphragm element to facilitate or bias the diaphragm element to its seated position within the valve. By employing a separate depression member, the manufacturing of the diaphragm element can be simplified by eliminating the need to form or mold the additional seat facilitating structures. Alternatively, the preferred depression member can supplement or enhance the function of a seat facilitating structure formed in the diaphragm element. In one preferred embodiment of the invention, a diaphragm-type control valve is provided that has a valve body defining an internal chamber and an inlet and an outlet communicating with the chamber. The chamber encloses a diaphragm disposed to control flow between the inlet and outlet by moving the diaphragm between a first position allowing flow through the valve and a second position that inhibits flow by having the diaphragm engage a seat member within the valve body. A depression member disposed in the valve body biases the diaphragm into the second position. A preferred depression member has an annular base with eight radial projections that extend inwardly from the base and that curve at resilient portions to dispose the projections at an angle relative to the base. In some embodiments, the valve body has a sealing surface where two portions of the valve body join, and the base member is supported adjacent to the sealing surface so as to be held by the joining of the two valve body members, so that the depression member is supported within the valve body without a fixed engagement to the diaphragm. In each embodiment the radial projections of the depression member have a resilient portion that resiliently bends to allow the radial projection to assume a deflected position and a depressed position with the depressed position biasing the diaphragm into the second position that inhibits flow through the valve. Preferably, the resilient portion defines a pivot point about which the resilient portion or the radial portion pivots when transitioning between the deflected and depressed positions.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the exemplary embodiments of the invention.

DETAILED DESCRIPTION

Figure 1:
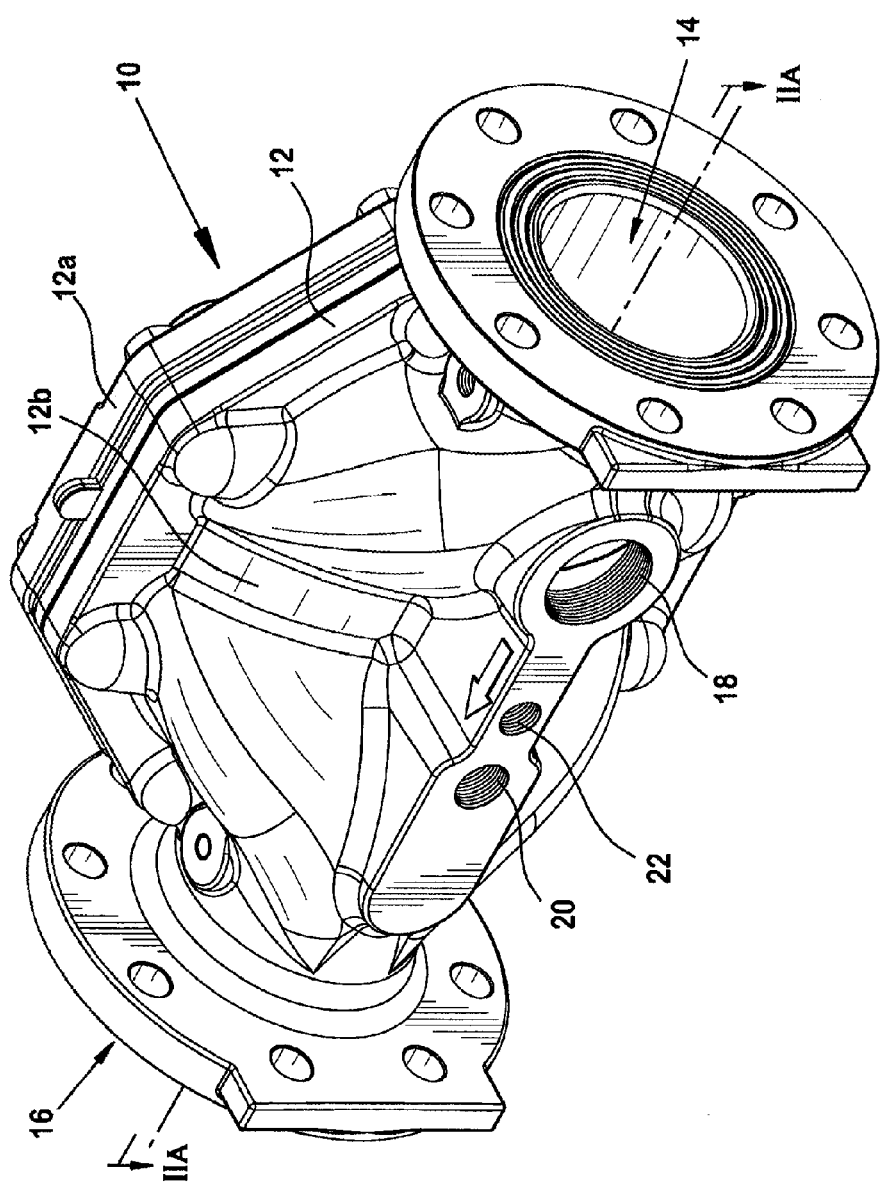
FIG. 1 is a perspective view of a preferred control valve.

Shown in FIG. 1 is an illustrative embodiment of a preferred control valve 10. The valve 10 includes a valve body 12 through which fluid can flow in a controlled manner. More specifically, the control valve 10 provides a diaphragm-type hydraulic control valve for preferably controlling the release and mixture of a first fluid volume having a first fluid pressure, such as for example a water main, with a second fluid volume at a second fluid pressure, such as for example, compressed gas contained in a network of pipes. Accordingly, the control valve 10 can provide fluid control between fluids or various media including liquids, gasses or combinations thereof.

The control valve 10 is preferably configured for installation in a piping manifold or other piping assembly to separate and control fluid flow between the first fluid volume and the second fluid volume. The control valve 10 includes a valve body 12 preferably constructed in two parts: (i) a cover portion 12a and (ii) a lower body portion 12b. "Lower body" is used herein as a matter of reference to a portion of the valve body 12 coupled to the cover portion 12a when the control valve is fully assembled. Preferably, the valve body 12 and more specifically, the lower body portion 12b includes an inlet 14 and outlet 16. Each of the inlet and outlet 14, 16 of the body 12 includes an appropriate end fitting for coupling to the manifold. Thus, the inlet 14 preferably includes a flanged end for coupling to a first fluid supply line, such as for example a water main, and the outlet 16 also preferably includes a flanged end for coupling to another pipe fitting such as, for example, a discharge pipe coupled to a network of interconnected pipes. The control valve 10 can be installed in either a horizontal orientation such that fluid entering the inlet 14 at one elevation is discharged from the outlet 16 at the same elevation, or alternatively, the control valve can be installed in a vertical orientation such that fluid entering the inlet at one elevation is discharged from the outlet at a different elevation.

The inlet 14, outlet 16 and valve body 12 can be sized so as to provide a range of nominal valve sizes for coupling to corresponding pipe size. Preferably, the inlet 14, outlet 16 and valve body 12 define nominal valve sizes of 1 inch and larger and more specifically nominal valve sizes of 1½ inch, 2 inch, 3 inch, 4 inch, 6 inch and 8 inch; however other nominal valve sizes can be provided. Preferably, the valve 12, the cover 12a and the lower valve body 12b are separately cast and machined to provide the preferred openings and surface treatments such as threaded openings. However, other processes for construction and manufacturing can be used. The valve body 12 is preferably cast from ductile iron; however, other materials may be used provided they are suitable for a given fluid flow application.

The valve body 12 also includes a drain 18 for diverting the first fluid entering the valve 10 through the inlet 14 to outside the valve body. The valve body 12 further preferably includes an input opening 20 for introducing the second fluid into the body 12 for discharge out the outlet 16. An exemplary cover 12a, and lower body 12b with an inlet 14, an outlet 16, a fluid drain 18 and an input opening 20, is shown and described in U.S. Pat. Nos. 6,095,484 and 7,059,578. However, unlike the valves shown and described in U.S. Pat. Nos. 6,095,484 and 7,059,578, the preferred diaphragm-type control valve 10 further includes a valve body 12 with a port 22. The inclusion of a port 22 in the valve body 12 can provide means for an alarm system monitoring the valve for any undesired fluid communication from and/or between the inlet 14 and the outlet 16. For example, the port 22 can be used for providing an alarm port to the valve 10 so that individuals can be alerted as to any gas or liquid leak from the valve body 12. More specifically, the port 22 can be coupled to a flow meter and alarm arrangement to detect the fluid or gas leak in the valve body. In addition, the port 22 is preferably open to atmosphere and in communication with an intermediate chamber disposed between the inlet 14 and the outlet 16. Each of the fluid drain 18, input opening 20 and port 22 can include an appropriately threaded opening or other mechanical fastening member for coupling an appropriate pipe fitting or nipple to the given orifice.

Figure 2:
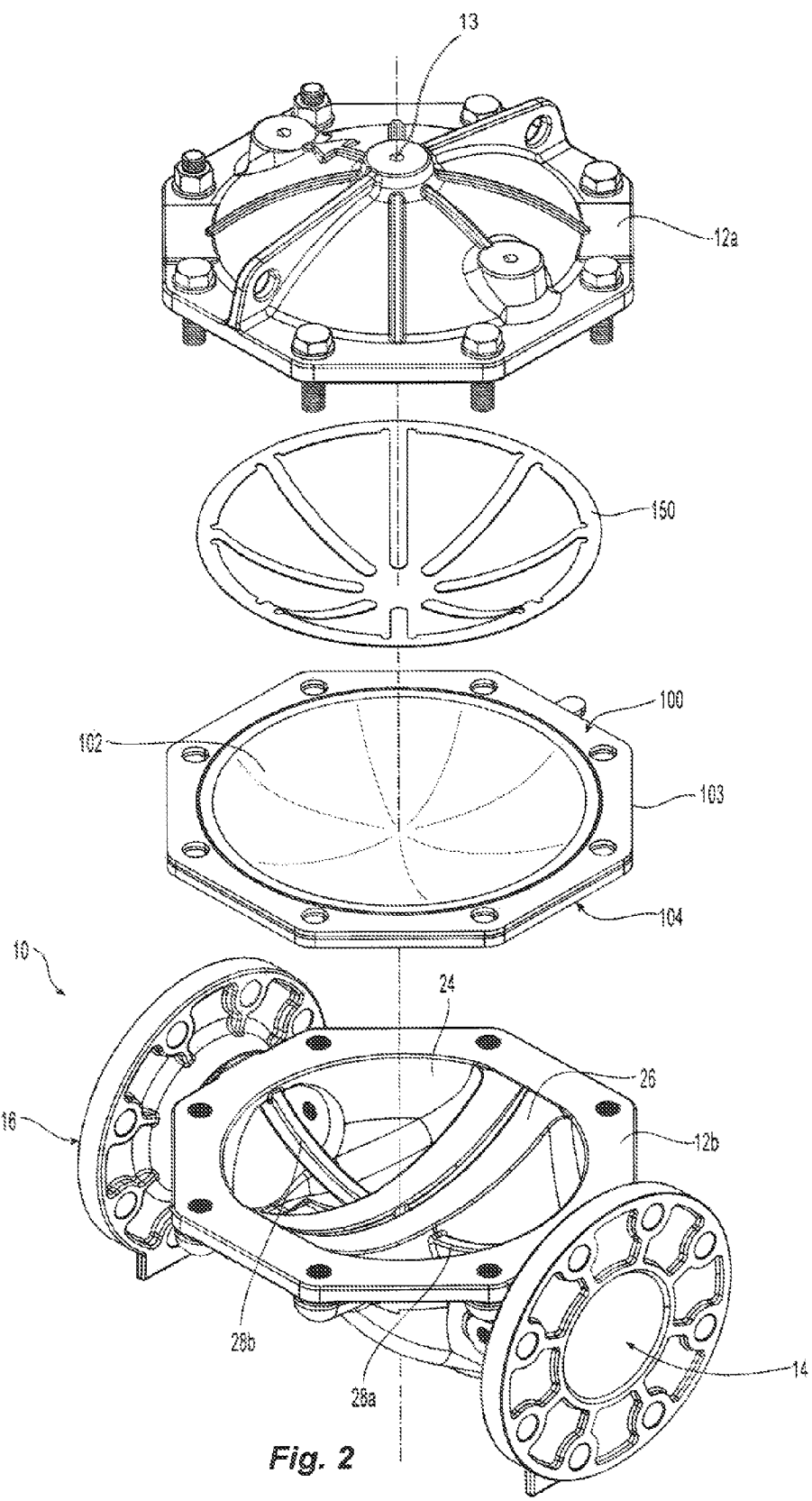
FIG. 2 is an exploded view of the control valve of FIG. 1.

Shown in FIG. 2 is an exploded view of the preferred valve 10 showing the internal components of the valve 10. The cover 12a and the lower body portion 12b are preferably coupled together by a plurality of bolts distributed in a bolt pattern about the body 12. Shown in FIG. 2B is a plan view of the control valve 10 and a preferred bolt pattern that includes eight nut and bolt assemblies. In an alternative bolt assembly, shown for example in FIG. 2C, a threaded stud nut and assembly 50 can be utilized. The stud assembly 50 preferably includes a threaded stud 52 engaged with the corner bolt holes of the cover 12a and the lower valve body 12b. To secure the cover 12a to the assembly, the washer 56 and nut 54 can be threaded onto and tightened about the stud 52. The stud assembly 50 can facilitate the assembly of the control valve 10 when installed in the vertical orientation. More specifically, preferably four threaded studs 52 can be equally spaced about the bolt pattern engaged with the lower valve body 12b. The studs can be permanently or temporarily fixed to the lower valve body 12b. The cover 12a can then be disposed over the threaded studs 52 and permitted to hang supported by the threaded studs 52 thereby freeing an assembler's hands to complete the control valve assembly with the necessary threaded bolt and nut assemblies. Preferably, each of the threaded studs 52 are preferably rated to support a transverse load of between fifty to one hundred pounds (50-100 lbs.). To further facilitate assembly of the control valve 10, the cover 12a can include one or more eyelets to which a hook and cable or chain may be secured for lifting the cover 12a into position adjacent the lower valve body 12b.

The cover 12a and the lower body 12b each include an inner surface such that, when the cover and lower body portion 12a, 12b are joined together, the inner surfaces further define a chamber 24. The chamber 24, being in communication with the inlet 14 and the outlet 16, further defines a passageway through which a fluid, such as water, can flow. Disposed within the chamber 24 is a flexible preferably elastomeric member 100 for controlling the flow of fluid through the valve body 12. The elastomeric member 100 is more preferably a diaphragm member configured for providing selective communication between the inlet 14 and the outlet 16. Accordingly, the diaphragm member 100 has at least two positions within the chamber 24: a lower most fully closed or sealing position and an upper most or fully open position. As shown in FIG. 2, disposed within the chamber 24 is a resilient depression member 150 positioned to bias the elastomeric member 100 into the closed and sealing position.

Figure 2A:
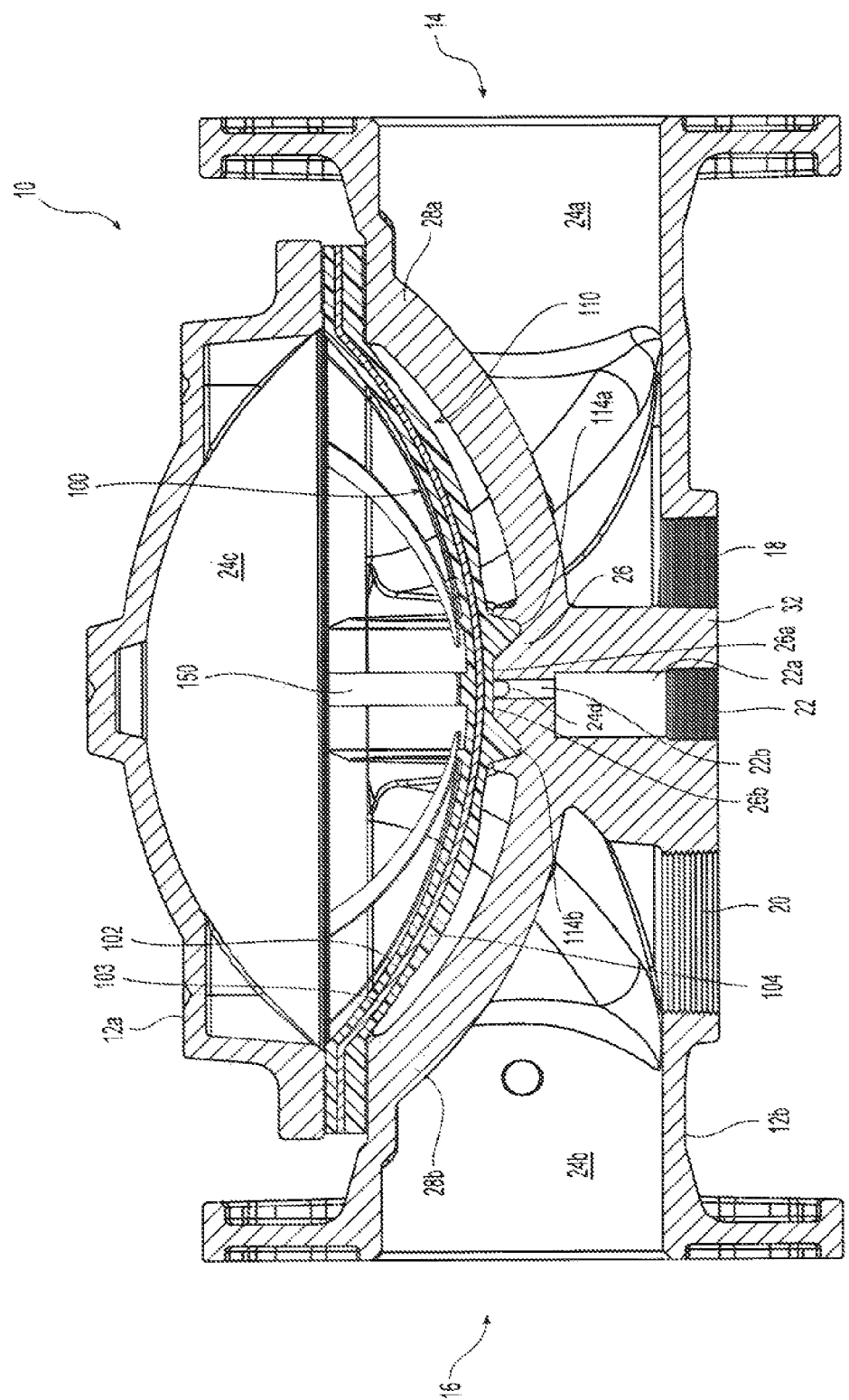
FIG. 2A is a cross-sectional view of the control valve of FIG. 1.
Figure 2B:
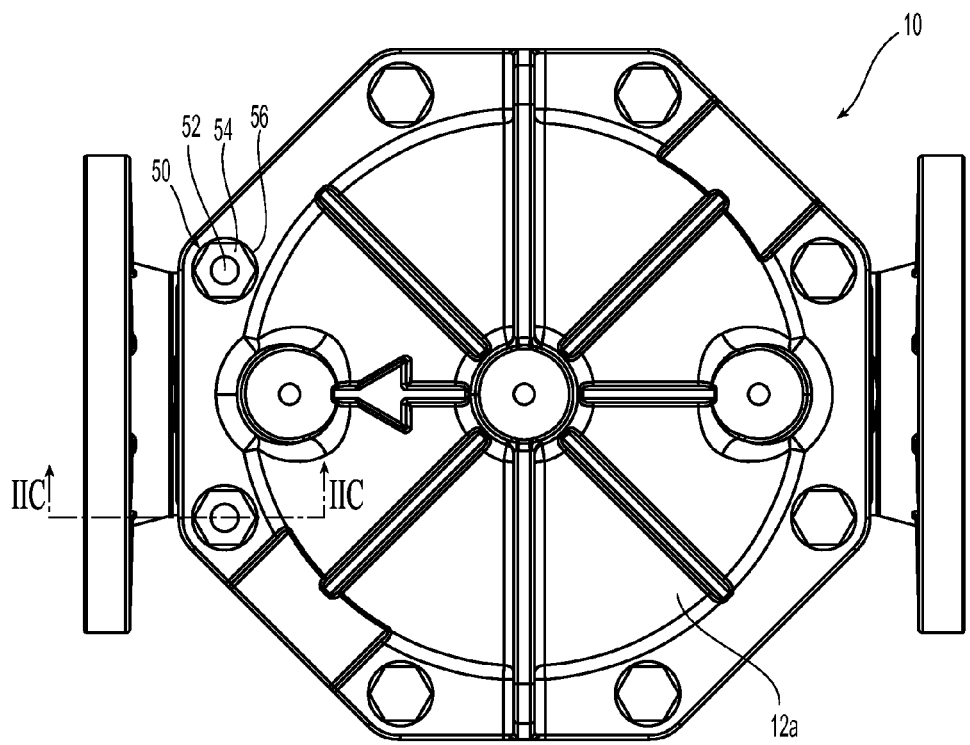
FIG. 2B is a plan view of the control valve of FIG. 1.
Figure 2C:
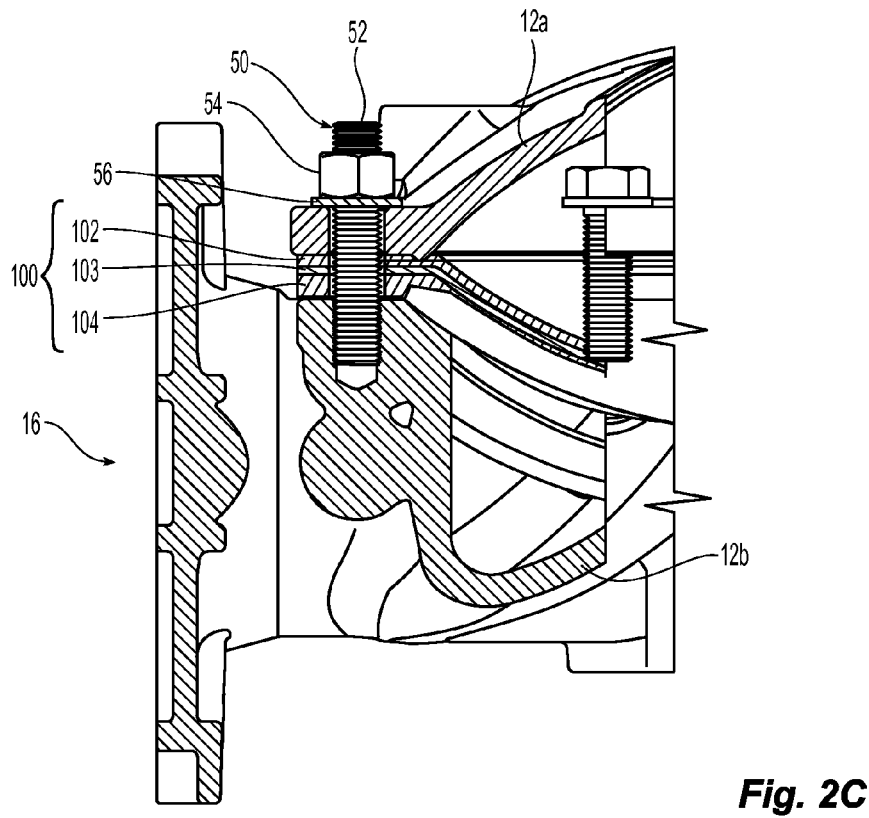
FIG. 2C is a detailed view of a preferred threaded stud assembly for use in the control valve of FIG. 1.

In the lower most closed or sealing position, as seen for example in FIG. 2A, the diaphragm 100 engages a seat member 26 constructed or formed as an internal rib or middle flange within the inner surface of the valve body 12 thereby sealing off communication between the inlet 14 and the outlet 16. With the diaphragm 100 in the closed position, the diaphragm 100 preferably dissects the chamber 24 into at least three regions or sub-chambers 24a, 24b and 24c. More specifically formed with the diaphragm member 100 in the closed position is a first fluid supply or inlet chamber 24a in communication with the inlet 14, a second fluid supply or outlet chamber 24b in communication with the outlet 16 and a diaphragm chamber 24c. The cover 12a preferably includes a central opening 13 for introducing an equalizing fluid into the diaphragm chamber 24c to urge and hold the diaphragm member 100 in the closed position. Preferably, the equalizing fluid is provided from the first fluid source such that any surges in flow or pressure experienced at the inlet chamber 24a are also experienced in the diaphragm chamber 24c such that the diaphragm chamber can react and compensate with a diaphragm pressure to maintain the diaphragm member 100 in the closed position.

Moreover, the preferred relative orientation of the sub-chambers 24a, 24b, 24c is such that each of the inlet and outlet chambers 24a, 24b are adjacent the diaphragm chamber 24c which, in combination with the flexibility of the diaphragm member 100, contributes to the ability of the diaphragm chamber 24c to compensate for surges in the flow or pressure experienced in either the inlet or outlet chambers 24a, 24b. In addition, the preferred orientation can further facilitate the performance of the valve 10 to maintain the sealed engagement of the diaphragm member 100 under the preferred ratio of equalizing fluid pressure to primary fluid pressure in a manner described in greater detail below. Known fluid control valves that use either a more rigid type of diaphragm or a mechanical latching clapper are believed to require an increased mechanical force or equalizing pressure to maintain a seal within the valve in order to compensate for any possible surges or fluctuations in the fluid being conveyed.

In operation of the control valve 10, the equalizing fluid can be relieved from the diaphragm chamber 24c in preferably a controlled manner to urge the diaphragm member 100 to the fully open or actuated position, in which the diaphragm member 100 is spaced from the seat member 26 thereby permitting the flow of fluid between the inlet 14 and the outlet 16. The fluid release from the diaphragm chamber 24c can be regulated by way of, for example, an electrically controlled solenoid valve, such that the diaphragm member 100 can achieve regulated positions between the fully closed position and the fully open position. Accordingly, the diaphragm member 100 is preferably electrically actuated between the open and closed positions. Alternatively, the diaphragm can be actuated, regulated and/or closed or latched by other mechanisms such as, for example, a mechanical latching mechanism.

Shown in FIGS. 3A-3D is an illustrative embodiment of the diaphragm member 100. The diaphragm member 100 preferably defines a central axis A-A, and includes an upper surface 102 and a lower surface 104 preferably circumscribed by a flange portion 101 having a bolt pattern for being compressed and secured between the cover 12a and lower valve body 12b. Each of the upper and lower surface areas 102, 104 are generally sufficient in size to seal off communication of the inlet and outlet chamber 24a, 24b from the diaphragm chamber 24c. The upper and lower surface areas 102, 104 are preferably substantially circular in plan view; however, other geometries are possible depending on the geometry of the chamber 24 and provided that the surfaces effectively dissect and seal the chamber 24. The upper surface 102 of the diaphragm member is preferably smooth.

In its closed position, the lower surface 104 of the diaphragm member 100 preferably defines a centralized bulged portion 110 to avoid excessive stretching of the diaphragm material during diaphragm cycling and to enhance stability in both the upper and lower positions. The lower surface 104 thus preferably presents a substantially convex surface, and more preferably a spherical convex surface, with respect to the seat member 26, having an area A1, and the upper surface 102 presents a substantially concave surface, and more preferably a spherically concave surface with respect to the diaphragm chamber 24c, having an area A2. Upper surface A2 is preferably about equal to A1. Portions of the lower surface 104 act to seal off fluid communication from the other chambers, i.e. a portion of lower surface 104 seals the inlet chamber 24a from the outlet chamber 24b and the diaphragm chamber 24c. Accordingly, substantially convex surfaces are preferably presented to seal off the inlet and outlet chambers 24a and 24b. Moreover, the preferred geometry of the sub-chambers 24a, 24b, 24c relative to one another preferably provides that the areas sealing the inlet and outlet chambers 24a, 24b are about equal, and that the inlet chamber 24a is sealed off by a portion of the lower surface 104 having an area of about ½ A1, and the outlet chamber is sealed off by a portion of the lower surface 104 having an area of about ½ A1. In one preferred embodiment of the diaphragm 100, the lower surface 104 defines a first radius of curvature and the upper surface 102 defines a second radius of curvature. Where the diaphragm 100 includes a middle layer 103, the middle layer can further define a third radius of curvature. The various radii of curvature can be measured from a common central point or alternatively from different center points. The ratio of the radius of curvature of a lower layer to the radius of curvature of an upper layer is preferably greater than 1 and sufficient to permit the lower surface 104 to engage the seat member 26 when the diaphragm 100 is in the lower position to adequately seal off the inlet and outlet chambers 24a, 24b. Alternatively or in addition, the lower surface 104 can further define more than one radius of curvature such that the lower surface 104 engages the seat member 26 in a sealing manner.

In one preferred embodiment of the diaphragm member 100 for use in a valve body having a nominal valve size of four inches (4 in.), the middle layer defines a radius of curvature of about 7.75 inches to about eight inches (8 in.) and is preferably about 7.95 inches. As used herein, the term "about" is understood as within a range of normal tolerance in the art, for example within 2 standard deviations of the mean. "About" can be understood as within 15%, 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about. The upper surface 102 preferably defines a radius of curvature of about 7.5 inches to about 7.75 inches and is preferably about 7.6 inches. Each of the radii of curvature for the middle layer 103 and the upper surface 102 is preferably measured from a common central point along the central axis A-A of diaphragm member 100. Thus, the ratio of the radii of curvature of the middle layer 103 to the upper surface 102 in a preferred four inch (4 in.) valve is about 1.05:1. In addition, the lower surface 104 preferably defines at least one radius of curvature ranging from about 4.25 inches to about 4.5 inches and is preferably about 4.33 inches measured from a center point off-set from the central axis A-A of the diaphragm member 100. More preferably, the center point is horizontally off-set from the central axis by about 1.4. Moreover, the bulged portion 110 preferably defines a diameter ranging from about 10.10 inches to about 11.10 inches and is preferably about 10.47 inches.

In one preferred embodiment of the diaphragm member 100 for use in a valve body having a nominal valve size of six inches (6 in.), the middle layer 103 defines a radius of curvature of about 8.5 inches to about 9 inches and is preferably about 8.78 inches and even more preferably about 9.06 inches. The upper surface 102 preferably defines a radius of curvature of about 8.25 inches to about 8.75 inches and is preferably about 8.58 inches. Each of the radii of curvature for the middle layer 103 and the upper surface 102 is preferably measured from a common central point along the central axis A-A of diaphragm member 100. Thus, the ratio of the radii of curvature of the middle layer 103 to the upper surface 102 in a preferred six inch (6 in.) valve is about 1.03:1. In addition, the lower surface 104 preferably defines at least one radius of curvature ranging from about 5.25 inches to about 5.5 inches and is preferably about 5.3 inches measured from a center point off-set from the central axis A-A of the diaphragm member 100. More preferably, the center point is horizontally off-set from the central axis by about 1.6 inches. Moreover, the bulged portion 110 preferably defines a diameter ranging from about 12.45 inches to about 13.75 inches and is preferably about 12.9 inches. The preferred diaphragm member 100 is configured to engage and cooperate with the inner surfaces of the cover 12a and lower body 12b to define the three chambers 24a, 24b, 24c in an orientation that can provide for a diaphragm chamber 24c that can effectively compensate for fluctuation and/or surges in fluid pressure in either one of the inlet and outlet chambers 24a, 24b.

Figure 3A:
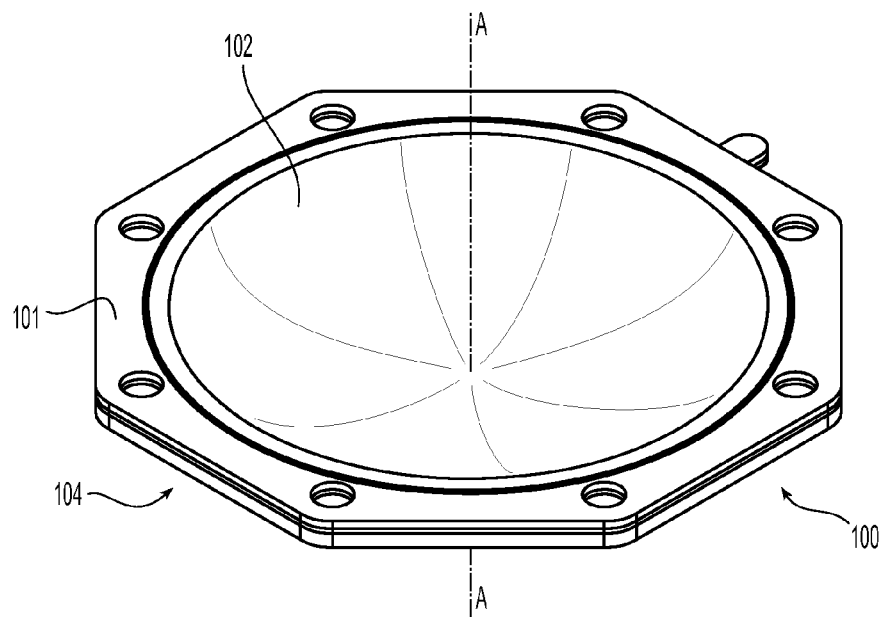
FIG. 3A is an isometric view of the upper surface of a preferred diaphragm for use in the control valve of FIG. 1.
Figure 3B:
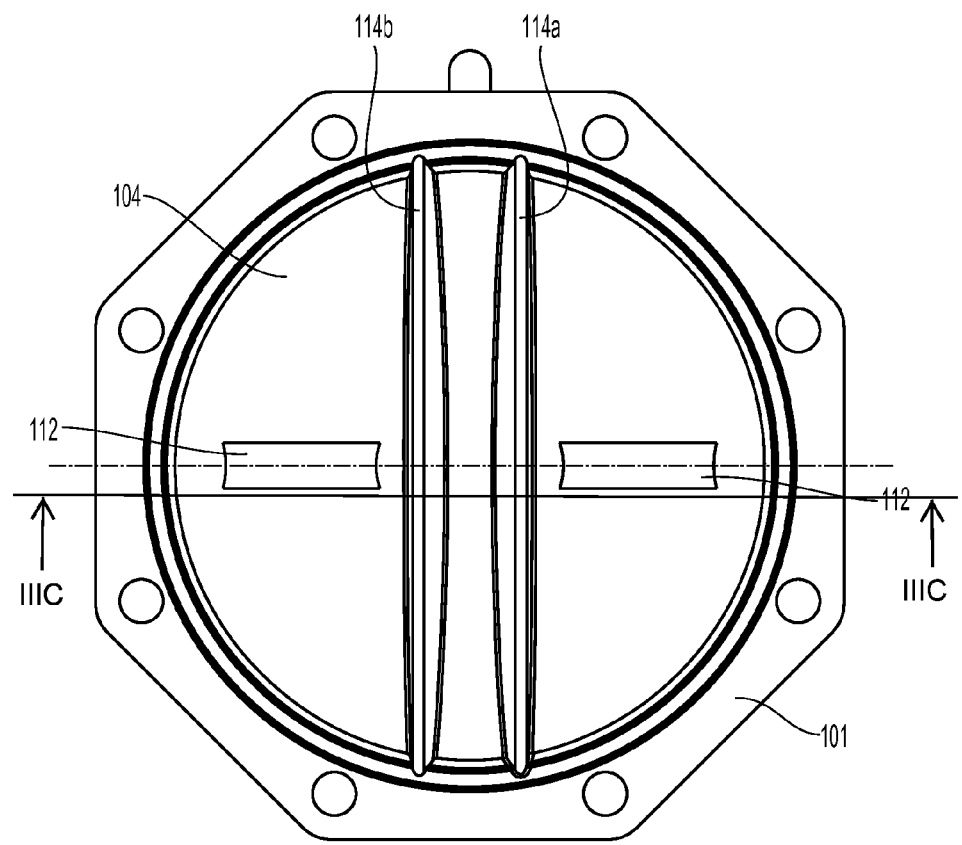
FIG. 3B is a plan-view of the lower surface of the diaphragm in FIG. 3.
Figure 3C:
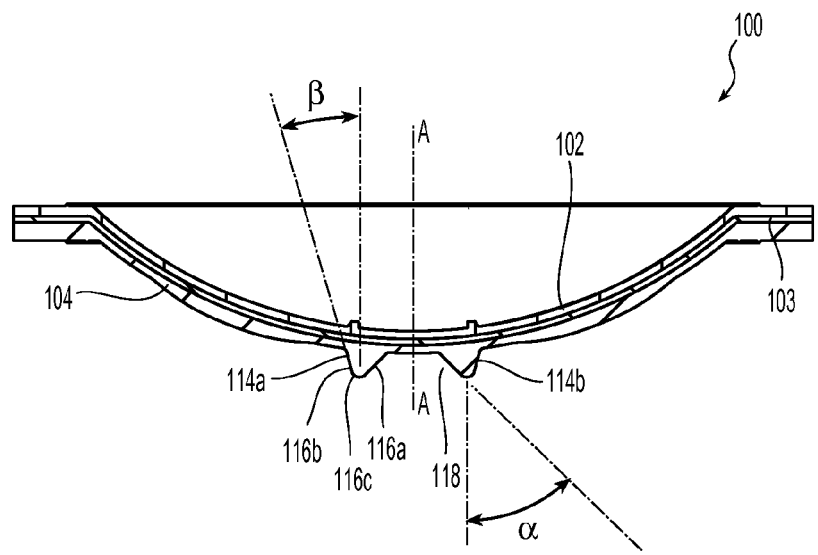
FIG. 3C is a cross-sectional view of the diaphragm along axis IIIC-IIIC in FIG. 3B.
Figure 3D:
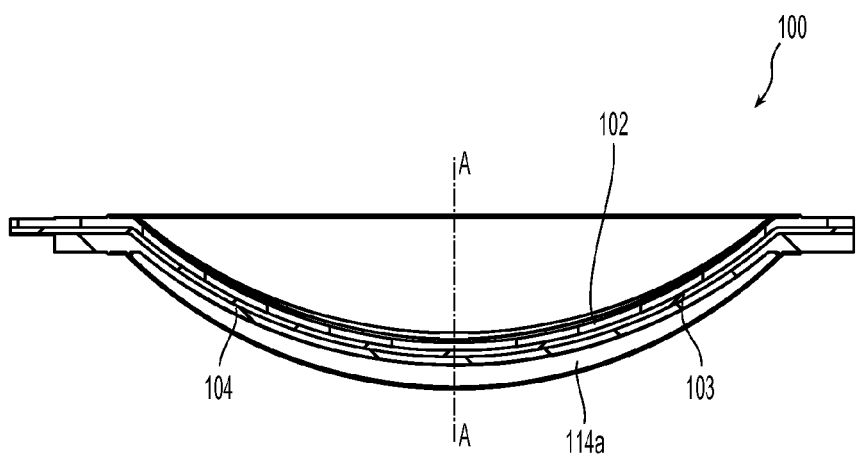
FIG. 3D is another cross-section view of the diaphragm along axis IIIC-IIIC in FIG. 3B.

The lower surface 104 of the diaphragm member 100, as seen more specifically in FIG. 3B, preferably includes one or more support pads or elements 112 for supporting the diaphragm member 100 when the diaphragm cycles between the open and closed positions within the chamber 24. More specifically, the support pads 112 are configured to engage a portion of the inner surface of the lower valve body 12b to support the diaphragm 100.

The lower surface 104 of the diaphragm member further preferably includes a pair of elongated sealing elements or projections 114a, 114b to form a sealed engagement with the seat member 26 of the valve body 12. The sealing elements 114a, 114b preferably extend in a parallel fashion along the lower surface 104 for a length about equivalent to the maximum arc length defined by the surface 104. Each of the elongated sealing elements 114a, 114b preferably tapers narrowly in cross-section (perpendicular to the axis of elongation) having a first angled surface 116a and a second angled surface 116b each extending from or contiguous with the lower surface 104, as seen for example in FIG. 3C. Alternatively, the sealing elements 114a, 114b can define any cross-sectional geometry provided the sealing element provides the sealing function provided herein. The first angled surface 116a preferably defines an included angle α with a line parallel to the central axis A-A of about forty-five degrees. The second angled surface 116b preferably defines an included angle β with a line parallel to the central axis A-A of about fifteen degrees. Disposed between the first and second angled surfaces 116a, 116b is a terminal surface 116c to terminate the sealing element and thereby define the height of the projection. Preferably, the terminal surface 116c defines a surface having one or more radii of curvature over its length from the first angled surface to the second angled surface. More preferably, the terminal surface 116c defines a peak of the sealing element having at least one radius of curvature.

The sealing elements 114a, 114b are preferably spaced apart so as to define a void or channel 118 therebetween. The parallel first angled surfaces 116a of the sealing elements 114a, 114b along with a portion of the lower surface 104 disposed therebetween further define the sidewalls of the void or channel 118 and its channel height. The sealing elements 114a, 114b are configured to engage the seat member 26 of the valve body 12 when the diaphragm is in the closed position so as to seal off communication between the inlet 14 and the outlet 16 and more specifically seal off communication between the inlet chamber 24a and the outlet chamber 24b. Furthermore, the sealing members 114a, 114b engage the seat member such that the channel 118 cooperates with the seat member 26 to form an intermediate chamber 24d to axially space the inlet chamber 24a and the outlet chamber 24b in a manner described in greater detail herein below. The lower surface 104 of the diaphragm can include more than two sealing elements 114a, 114b provided that the additional sealing elements cooperate with the seat member 26 in a sealing fashion and allow for the formation of the intermediate chamber. Moreover, the lower surface 104 can be formed or constructed with any other surface formation, such as a convolution, provided that the formation can effectively form a sealed engagement with the seat member 26 and further provide for the channel 118 to facilitate formation of the intermediate chamber 24d.

The material to be used for manufacturing the diaphragm 100 is dependent on the type of fluid being carried and on the temperature range to which the diaphragm is to be exposed. Preferably, the upper and lower surfaces 102, 104 of the diaphragm 100 are constructed from layers of natural rubber material having a durometer hardness or shore value of about seventy-five (75) and further a pressure rating of about 2560 pounds per square inch (2560 psi.). Suitable materials for use at the upper and lower surfaces 102, 104 include, for example, nitrile butadiene rubber and neoprene. Materials that can be used for reinforcements between the upper and lower surface layers at middle layer 103 of the diaphragm 100 include, for example, cotton and nylon and more preferably, nylon no. 2 reinforced material.

Figure 4A:
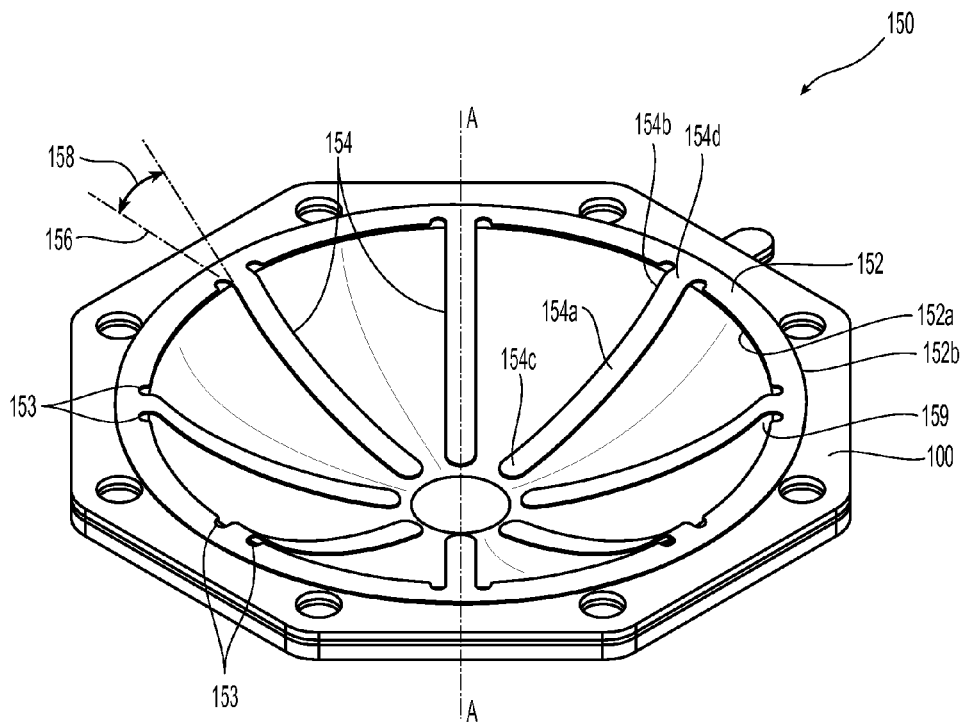
FIG. 4A is an isometric view of a preferred depression member for use in the control valve of FIG. 1.
Figure 4B:
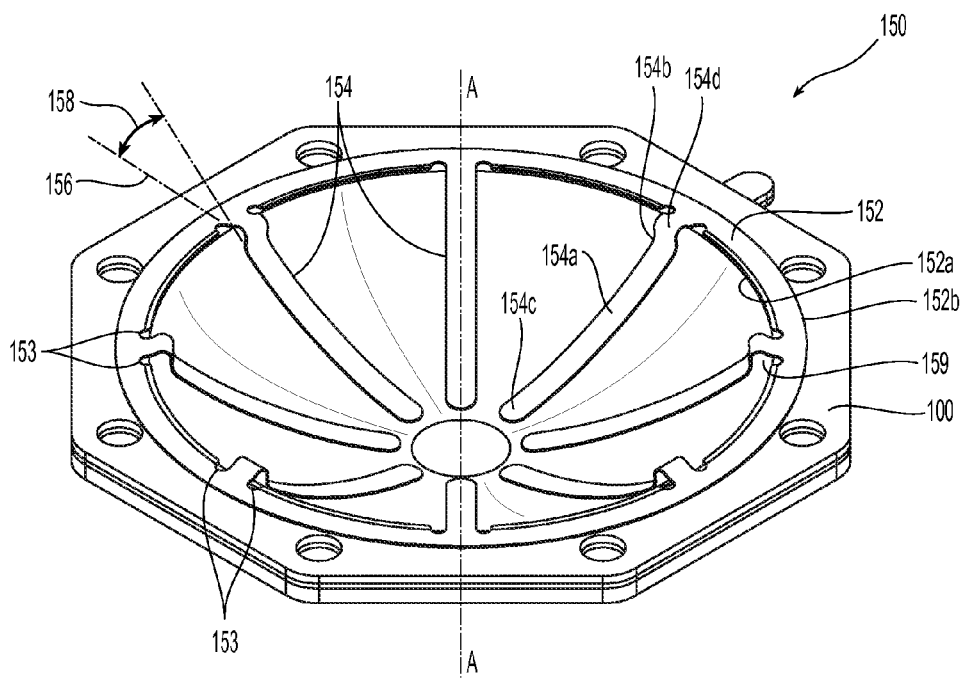
FIG. 4B is an isometric view of another preferred depression member for use in the control valve of FIG. 1.

Shown in FIGS. 4A-4B are two illustrative embodiments of the depression member 150. The depression member 150 preferably includes an annular base portion 152 and radial projections 154 that extend inwardly from the base portion 152 about the central axis A-A. The annular base portion 152 preferably has an inner surface 152a facing the central axis A-A from which the radial projections 154 extend, and an outer perimeter 152b that is disposed in a plane 156 that is preferably perpendicular to the central axis A-A. The radial projections 154 preferably extend inwardly from the inner surface 152a towards each other. In the illustrations of the preferred embodiments, eight radial projections are distributed equidistantly on the inner surface 152a about the central axis A-A.

The radial projections 154 preferably have an arcuate portion 154a that has a curvature and opposing ends, with a mounting end 154b of each radial projection facing the annular base portion 152 and an opposing free end 154c facing the central axis A-A. The arcuate portion connects to the annular base portion via a resilient portion 154d that extends between the arcuate portion 154a and the base portion 152. The resilient portion 154d extends from the annular base portion 152 towards the central axis A-A and provides a bend that disposes the arcuate portion 154a at an angle relative to the plane 156 defined by the annular base portion 152. In an alternative embodiment, the free end 154c can be a curled end where the arcuate portion curls back on itself to assist with the sliding of the arcuate portion over the upper surface 102 of the diaphragm. Furthermore, the upper surface 102 of the diaphragm can include ridges or projections disposed to sit on each side of the arcuate portion 154a to receive each arcuate portion 154a and to guide the arcuate portion 154a to follow a path between pairs of ridges or projections when the arcuate portion slides over the upper surface 102 of the diaphragm.

Preferably, the resilient portion 154d is a resilient bend in the radial projection 154 that provides an angulation to the radial projection, to define a depression angle 158 of the depression member 150 between the mounting end 154b and the annular base portion 152. The depression angle 158 can be taken from various points along the length of the resilient portion 154d or from various points on the annular base portion 152 or the arcuate portion 154a, and is preferably taken at comparable points that are directly opposed to each other about the resilient portion 154d, and is most preferably taken at the points where the resilient portion 154d engages or transitions into the annular base portion 152 or the arcuate portion 154a. The resilient portion 154d is preferably resilient and can be reversibly deformed by the application of an external force to store energy in the resilient portion 154d and temporarily change the depression angle 158 from one angle to another angle. Preferably, the external force compresses the depression member 150 in a direction parallel to the central axis A-A to bring the arcuate portions 154a closer together and to change the depression angle 158 to a smaller angle. The stored energy is preferably released as an expanding force when the depression member 150 returns or attempts to return to its original angulation. The arcuate portions 154a are cantilevered from the resilient portion 154d as each extends from the resilient portion 154d towards the central axis A-A. When the stored energy in the resilient portion 154d is being released, the force is distributed along the lengths of the cantilevered arcuate portions 154a and the cantilever can be configured to control how the force is distributed. The resilient bend of the resilient portion 154d, and the movement of the arcuate portion 154a and the resilient portion 154d about the bend of the resilient portion 154c, define a pivot point 159 about which the resilient portion 154d and/or the arcuate portion 154a pivot when the depression member 150 is loaded with an external force. Depending on the shape of the resilient bend, the pivot point 159 can be disposed at a position that is internal or external to the depression member 150 or within the mass of the resilient portion 154c itself. Preferably the pivot point 159 is at a radial distance from the central axis A-A that is less than the radial distance of the inner surface 152a from the central axis A-A.

The shape and configuration of the resilient portion 154d can vary to provide different properties for the depression member 150, to manipulate the position of the pivot point 159, and to vary how applied external forces are stored or released by the resilient portion 154d or the arcuate portion 154a. For example, as illustrated in FIG. 4A, the resilient portion 154d can initially extend from the base portion 152 along the plane 156 and then present a single bend that angles the arcuate portion 154a relative to the plane 156. In another example, illustrated in FIG. 4B, the resilient portion 154d can initially extend from the base portion 152 along the plane 156 and then present two bends with the first bend angled away from the arcuate portions 154a which leads to a second bend angled toward the arcuate portions 154a. As also illustrated in FIG. 4B, the two bends can be characterized as an undulation. In another alternative, instead of a bend, the resilient portion can be formed from separate components that are joined together to form the radial projections, such as a separate arcuate portion 154a and resilient portion 154d that are laid next to each other at mating ends and then joined with a weld, crimp, or band that holds the arcuate portion 154a and resilient portion 154d together to form a composite resilient portion. Also, as illustrated in FIGS. 4A-4B, the resilient portion 154d engages the base portion 152 with insets 153 that are stress-relieving scalloped areas disposed at corners formed between surfaces of the resilient and base portions.

The resilient portion can also be formed to provide a smooth curve that reacts linearly as the external force applied to the depression member is increased, or to have a variable profile with, for example, zig-zags that provide a non-linear reaction. In a further example, the resilient portion can have a profile that is a waveform that increases or decreases in frequency as the resilient portion comes into engagement with the first and second ends so as to provide a varying response of the depression member as the external load increases; for example, a resilient portion with a waveform profile can be configured to become stiffer as an external load increases. The resilient portion can also have multiple bends that allow the resilient portion to store energy from an external force at several points along a length of the resilient portion or arcuate portion so as to distribute such loads over a larger area, or have bends that focus the energy at predetermined points on the resilient portion. The shape of the resilient portion can be modified to position the pivot point 159 at a location within the profile of the depression member 150, or modified to provide multiple pivot points as the external force increases or modified to provide a pivot point that moves as the external force increases. The shape of the resilient portion 154d can also be modified to vary how forces are distributed between the resilient portion 154d and the mounting and free ends 154b, 154c. For example, the width of the resilient portion can be increased to provide a stiffer connection where the resilient portion 154d engages the mounting ends 154b as compared to a more remote portion of the arcuate portion that has a narrower profile. In another example, the width of the arcuate portion 154a can be varied along its length to provide the mounting and free ends with varying stiffness.

The sealing elements 114a, 114b of the diaphragm member 100 are configured to form a sealed engagement with the seat member 26 of the valve body 12. Shown in FIGS. 5A-5D are detailed views of the preferred lower valve body portion 12b of the control valve 10. The lower control valve body 12b preferably defines a first valve axis IVC-IVC. The inlet and outlet 14, 16 of the control body are preferably centered about, coaxial with and spaced apart along the first valve axis IVC-IVC. Further centered along, spaced apart and substantially orthogonal to the first axis IVC-IVC are the fluid drain pipe 18 and the input opening 20 each respectively in communication with the fluid supply chamber 24a and the pressurized gas supply chamber 24b. Also extending along the first axis IVC-IVC are brace or support members 28a, 28b. The support members 28a, 28b are preferably aligned for engagement with the support pads 112 disposed or formed on the lower surface 104 of the diaphragm member 100. The support members 28a, 28b preferably extend from the flanges of the inlet and outlet 14, 16 to intersect the support member 26. The support members 28a, 28b preferably form a unitary construction with the support member 26 and the rest of the lower valve body 12b or, alternatively, the support members 28a, 28b can be joined to the support member 26 and the body 12 by other joining techniques such as, for example, welding.

The lower control valve body 12b further preferably defines a second axis IVD-IVD which is substantially orthogonal to the first axis IVC-IVC. Preferably aligned with the second axis IVD-IVD is the seat member 26 extending the width of the valve body 12 so as to effectively divide the chamber 24 in the lower valve body 12 into the preferably spaced apart and preferably equal sized sub-chambers of the inlet chamber 24a and the outlet chamber 24b. Moreover, the elongation of the seat member 26 preferably defines a curvilinear surface or arc having an arc length to mirror the convex surface of the lower surface 104 of the diaphragm 100. Further extending along the preferred arc length of the seat member 26 is a groove 30 constructed or formed in the surface of the seat member 26. The groove 30 preferably extends the full length of the seat member 26 so as to extend the width of the lower valve body 12b. Furthermore, the groove 30 preferably tapers narrowly at its ends. In addition, the walls of the seat member 26 that define the groove 30 are preferably parallel. Alternatively, the groove 30 can be formed such that the walls forming the groove 30 are angled relative to one another, another reference line or other surface in the valve body 12. The portion of the seat surface 26 defining the bottom of the groove 30 preferably forms a semi-circular arc in the plane perpendicular to the direction of elongation for the groove 30. Other geometries are possible provided the channel 30 delivers the desired fluid and pneumatic characteristics described herein. Moreover, the depth of the groove 30 can vary along its length such that the groove 30 is preferably deepest at its center and becomes more shallow toward its lateral ends. The groove 30 further bisects the engagement surface of the seat member 26 preferably evenly along the seat member length. With the support pads 112 of the diaphragm member 100 aligned to engage the support members 28a, 28b when the diaphragm member 100 is in the closed positioned, the elongated sealing members 114a, 114b are preferably aligned to engage the bisected surface of the seat member 26. Engagement of the sealing members 114a, 114b with the engagement surfaces 26a, 26b of the seat member 26 further places the channel 118 of the diaphragm 100 in communication with the groove 30.

Figure 5A:
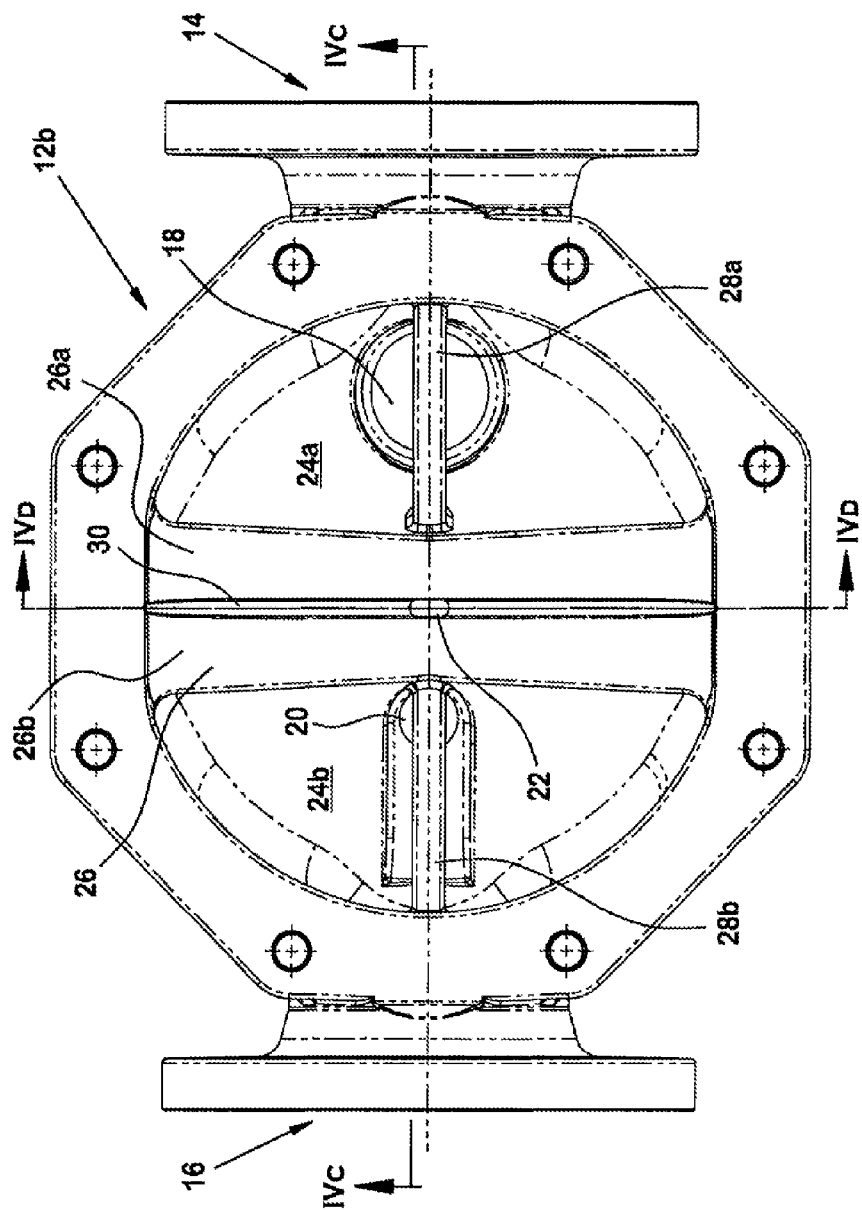
FIG. 5A is a plan-view of the lower valve body of the control valve in FIG. 1.
Figure 5B:
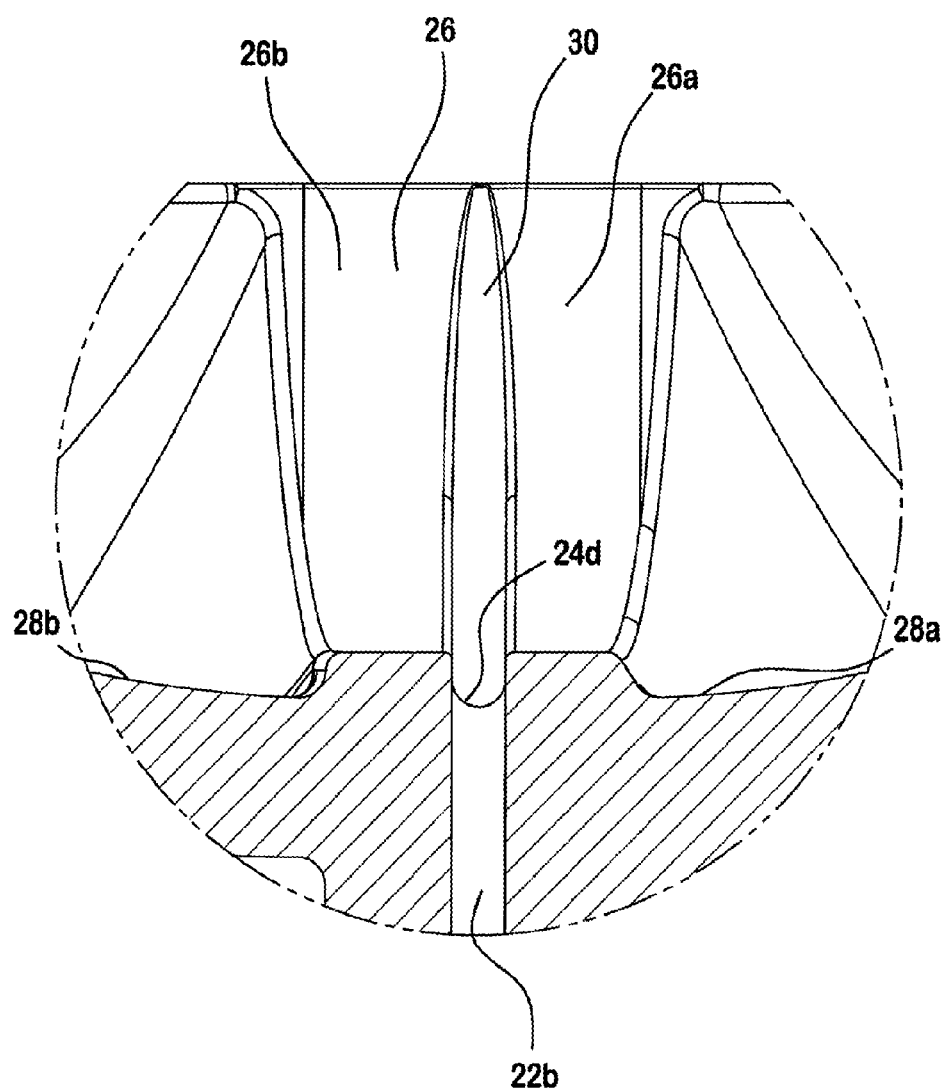
FIG. 5B is a cross-sectional detailed view of the lower valve body in FIG. 5A.
Figure 5C:
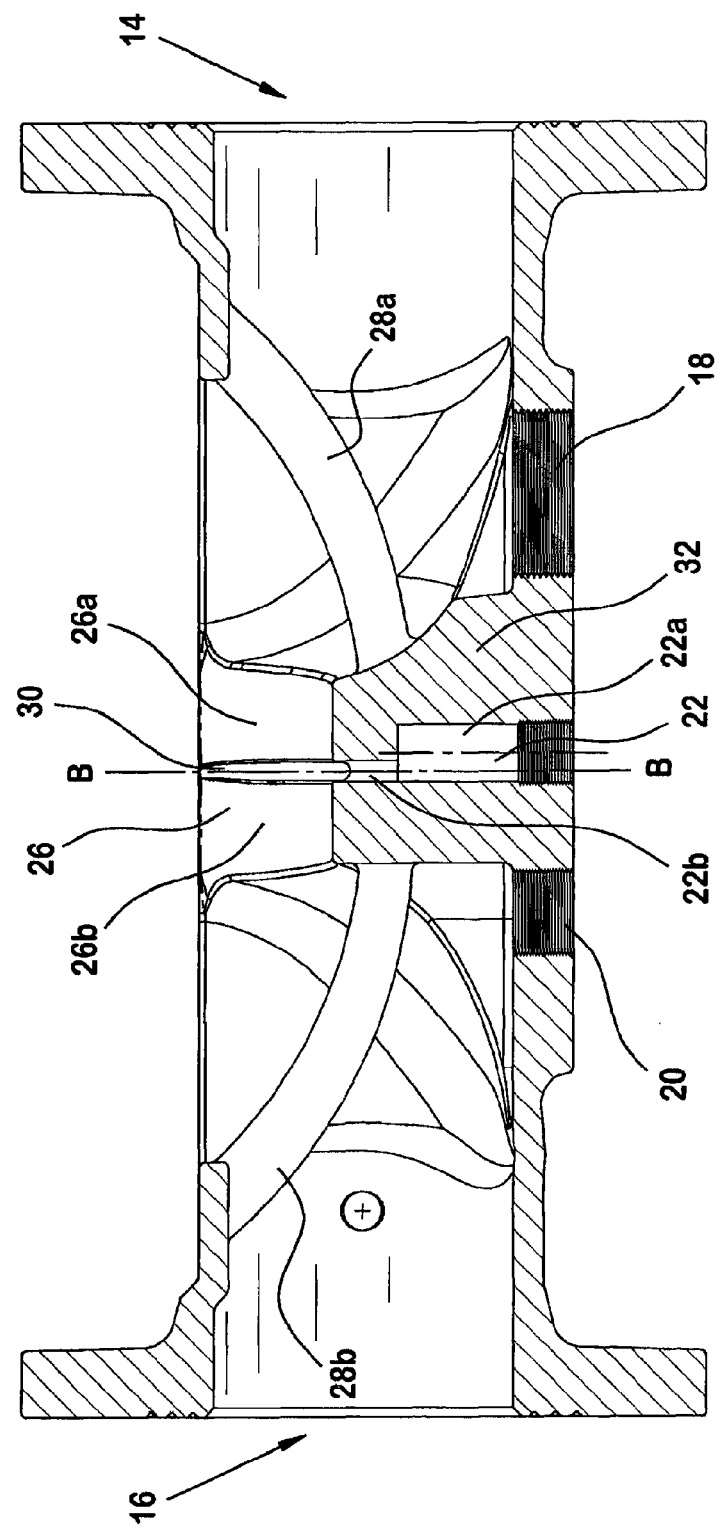
FIG. 5C is a cross-sectional view of the lower valve body along axis IVC-IVC in FIG. 5A.
Figure 5D:
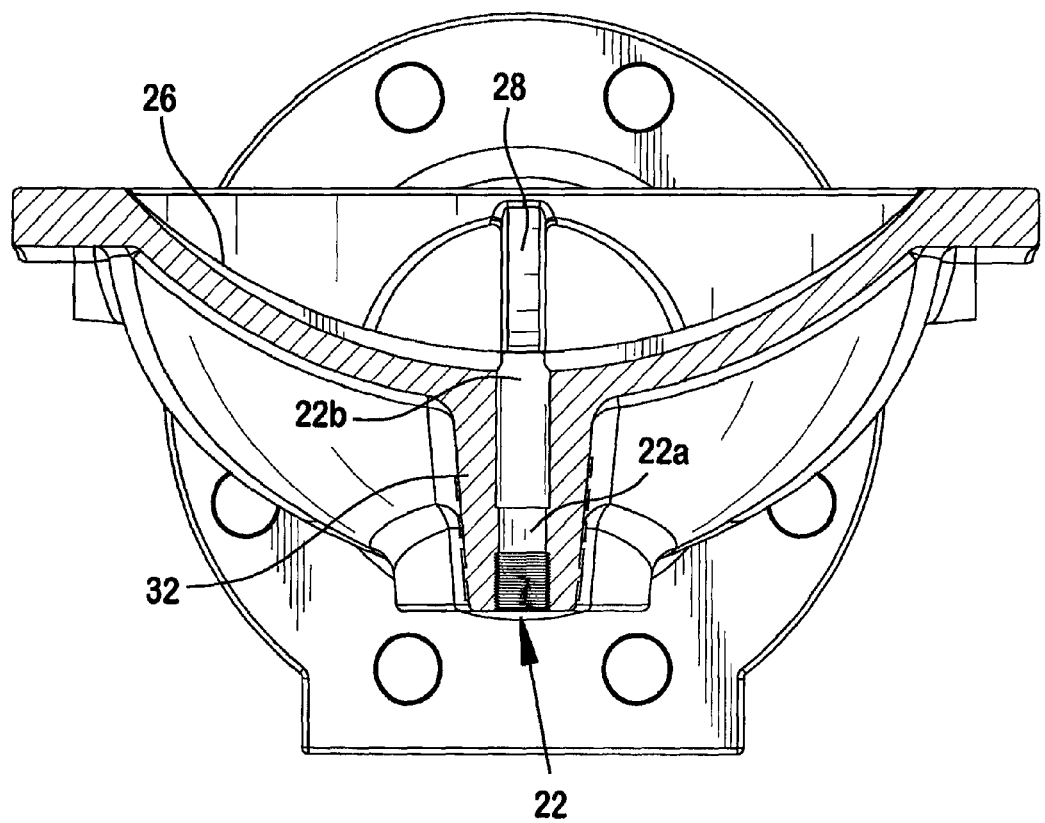
FIG. 5D is another cross-sectional view of the lower valve body along axis IVD-IVD in FIG. 5A.

Shown in FIG. 5B is a detailed view of the seat member 26 and its intersection with the support members 28a, 28b. Preferably, the engagement surfaces 26a, 26b of the seat member 26 are substantially planar, and the width of the engagement further preferably widens in a direction from the center of the engagement seat 26 to the lateral ends of the seat member 26. Generally, the surfaces 26a, 26b are configured sufficiently wide over their entire length so as to maintain sealing contact with the sealing elements 114a, 114b. Moreover, the surfaces 26a, 26b are configured wide enough so as to maintain sealing contact with the sealing elements 114a, 114b regardless of any movement of the sealing elements 114a, 114b along the longitudinal axis IVC-IVC. Accordingly, the surfaces 26a, 26b can maintain sealed engagement with the sealing elements 114a, 114b despite changes in fluid pressure in either the inlet or outlet chamber 24a, 24b which can impose forces on the diaphragm 100 and sealing elements 114a, 114b in a direction along the axis IVC-IVC.

The seat member 26 is preferably formed with a central base member 32 that further separates and preferably spaces the inlet and outlet chambers 24a, 24b and diverts fluid in a direction between the diaphragm 100 and the seat member engagement surfaces 26a, 26b. As seen, for example, in FIGS. 5C and 5D, the base member 32 is preferably broader in the direction along the first axis IVC-IVC than along the second axis IVD-IVD. The base member 32 is preferably substantially aligned with the central axis B-B of the valve body 12 which substantially orthogonally intersects the plane formed by the intersection of the first axis IVC-IVC and the second axis IVD-IVD. Preferably formed in the base member 32 between the drain 18 and the input opening 20 is the port 22.

The port 22 is preferably constructed as an alarm port from one or more voids formed in the base member 32. Preferably, the port 22 includes a first cylindrical portion 22a formed in the base member 32. The first cylindrical portion 22a preferably defines a central axis off-set or spaced from the central axis B-B of the lower valve body 12. The first cylindrical portion 22a is further preferably wider in the direction along the first axis IVC-IVC than in the direction along the second axis IVD-IVD. Accordingly, the first cylindrical portion 22a is preferably oblong in cross-section.

Axially in communication with the first cylindrical portion 22a is a second cylindrical portion 22b formed in the base member 32. The second cylindrical portion 22b is preferably wider in the direction along the second axis IVD-IVD than in the direction along the first axis IVC-IVC. Accordingly, the second cylindrical portion 22b is oblong in cross-section and preferably elongated in a direction substantially orthogonal to the direction of elongation of the first cylindrical portion 22a. The second cylindrical portion 22b preferably defines a central axis preferably aligned with the central axis B-B of the lower valve body 12. Moreover, the second cylindrical portion 22b preferably axially extends along the central axis B-B so as to intersect and be in communication with the groove 30. Accordingly, the port 22 preferably intersects and is in communication with the groove 30 and, when the diaphragm member 100 is in the closed position, the port 22 is further preferably in sealed communication with the channel 118 formed in the diaphragm member 100.

The communication between the diaphragm channel 118, the groove 30 and the port 22 is preferably bound by the sealed engagement of the sealing elements 114a, 114b with the seat member surfaces 26a, 26b, to thereby define a preferred fourth chamber, intermediate chamber 24d, as seen, for example, in FIG. 2A. The intermediate chamber 24d is preferably open to atmosphere thereby further defining a fluid seat, preferably an air seat to separate the inlet and outlet chambers 24a, 24b. The inventors have discovered that providing an air seat between the inlet and outlet chambers 24a, 24b allows each of the inlet and outlet chambers to be filled and pressurized while avoiding failure of the sealed engagement between the sealing element 114 and the seat member 26. Each sealing element 114 is acted upon by a fluid force on only one side of the element and preferably atmospheric pressure on the other, the fluid pressure in the diaphragm chamber 24c being effective to maintain the sealed engagement between the sealing elements 114 and the seat member 26 during pressurization of the inlet and outlet chambers 24a, 24b. Accordingly, the preferred diaphragm-type valve 10 can eliminate the need for a check valve downstream of the control valve, unlike, for example, the installations of the preaction fire protection systems shown and described in U.S. Provisional Patent Application No. 60/887,040. Moreover, the preferred control valve 10 and the preferred intermediate chamber 24d exposed to atmosphere can comply with the installation and/or operational requirements such as for example, FM Standard 1020, by providing a port for drainage or an alarm.

Figure 6:
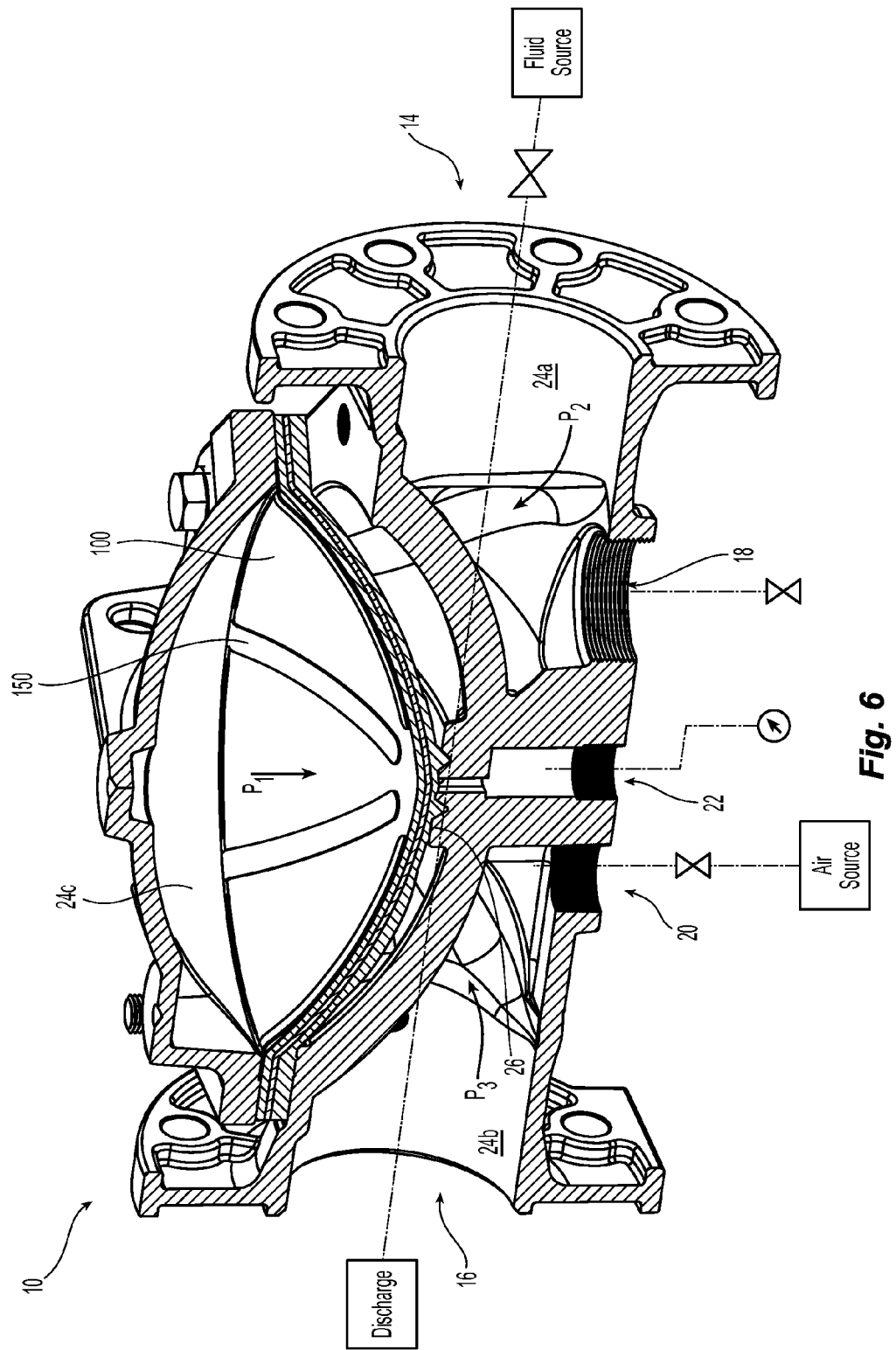
FIG. 6 is a cross-sectional perspective schematic view of the control valve of FIG. 1 installed in a preferred piping manifold.

The ability to pressurize both the inlet and the outlet chambers 24a, 24b is particularly useful where it is desirable to control release of a primary fluid such as, for example, water, into a normally closed system while providing and maintaining the system with a pressurized secondary fluid such as, for example, compressed air. For example, the control valve 10 can be installed and operated in a liquid/gas manifold in the following manner. The control valve 10 is disposed between the primary fluid source, such as for example, a water main and the secondary fluid source, such as for example, a compressed air feed or a source of compressed nitrogen gas. More specifically, as schematically shown, for example, in FIG. 6, the control valve 10 is preferably coupled to the primary fluid main at the inlet 14. The fluid drain 18 is preferably closed off by connection of an appropriate shut-off piping element such as, for example, a manual-shut off valve. The secondary fluid or compressed gas source is coupled to the input opening 20, and the outlet 16 is preferably coupled to the system to be filled and pressurized by the compressed gas.

The control valve 10 and the manifold can be placed into service by preferably bringing the valve 10 to the normally closed position and subsequently bringing the inlet chamber 24*a* and the outlet chamber 24*b* to operating pressure. In one preferred installation, the primary fluid source is initially isolated from the inlet chamber 24*a* by way of a shut-off control valve such as, for example, a manual control valve located upstream from the inlet 14. The secondary fluid source is preferably initially isolated from the outlet chamber 24*b* by way of a shut-off control valve located upstream from the input opening 20. An equalizing fluid, such as water from the primary fluid source, is then preferably introduced into the diaphragm chamber 24*c* through the central opening 13 in the cover 12*a*. Fluid is continuously introduced into the chamber 24*c* until the fluid exerts enough pressure P1 to bring the diaphragm member 100 to the closed position in which the lower surface 104 engages the seat member 26 and the sealing elements 114*a*, 114*b* form a sealed engagement about the seat member 26.

With the diaphragm member 100 in the closed position, the inlet and outlet chambers 24*a*, 24*b* can be pressurized respectively by the primary and secondary fluids. More specifically, the shut-off valve isolating the primary fluid can be opened so as to introduce fluid through the inlet 14 and into the inlet chamber 24*a* to preferably achieve a static pressure P2. The shut-off valve isolating the compressed gas can be opened to introduce the secondary fluid through the input opening 20 to pressurize the outlet chamber 24*b* and the normally closed system coupled to the outlet 16 of the control valve 10 to achieve a static pressure P3.

As described above, the presence of the intermediate chamber 24*d*, which is normally open to atmosphere, separating the inlet and outlet chambers 24*a*, 24*b* maintains the primary fluid pressure P2 to one side of the sealing member 114*a* and the secondary fluid pressure P3 to one side of the other sealing member 114*b*. Thus, diaphragm member 100 and its sealing members 114*a*, 114*b* are configured so as to maintain the sealed engagement with the seat member 26 under the influence of the diaphragm chamber pressure P1. Accordingly, the upper and lower diaphragm surface areas A1, A2, and A3 are preferably sized such that the pressure P1 is large enough to provide a closing force on the upper surface of the diaphragm member 100 so as to overcome the primary and secondary fluid pressures P2, P3 urging the diaphragm member 100 to the open position. However, preferably the ratio of the diaphragm pressure to either the primary fluid pressure P1:P2 or the secondary fluid pressure P1:P3 is minimized such that the valve 10 maintains a fast opening response, i.e. a low trip ratio, to release fluid from the inlet chamber when needed. More preferably, every 1 psi of diaphragm pressure P1 is at least effective to seal about 1.2 psi of primary fluid pressure P2. This is an advantage over known diaphragm valves that are believed to require a 1:2.5 pressure ratio of diaphragm pressure to primary fluid pressure because, in such known valves, the chambers are oriented such that the diaphragm pressure is directed completely in the normal direction to the diaphragm seat and the incoming fluid. Known mechanical latching deluge valves also are believed to require a 1:2.5 ratio because of similar chamber orientation and the need for a mechanical latch or linkage. Because the preferred control valve 10 can use a lower diaphragm pressure P1 to primary fluid pressure P2, the valve 10 can be constructed smaller than the known control valves of similar nominal valve size. Moreover, the low pressure ratio, in combination with the chamber orientation and flexible diaphragm, provides for the preferred control valve 10 that is capable of providing effective surge control or resistance to minimizing or more preferably eliminating false trips.

To actuate the valve 10, fluid is preferably released from the diaphragm chamber 24*c* at a faster rate than it can be replenished into the chamber 24*c*. For example, a solenoid control valve coupled to the chamber inlet 13 can be electrically actuated to release fluid from the diaphragm chamber 24*c*. The loss of pressure on the upper surface 102 of the diaphragm member 100 permits the fluid pressure in the adjacent fluid supply chamber 24*a* to urge the diaphragm member to the open position spaced from the seat member 26. Fluid is permitted to flow past the support members 28*a*, 28*b* (support members 28*a*, 28*b* not shown in FIG. 6 for clarity) to displace the compressed gas in the outlet chamber 24*b* for discharge out the outlet 16 and into the system coupled to the control valve 10. Fluid is further permitted to fill the groove 30 and flow out the alarm port 22. With an appropriate flow alarm coupled to the port 22, fluid flow can be detected and appropriate personnel can be notified of the operation of the valve 10.

Figure 7:
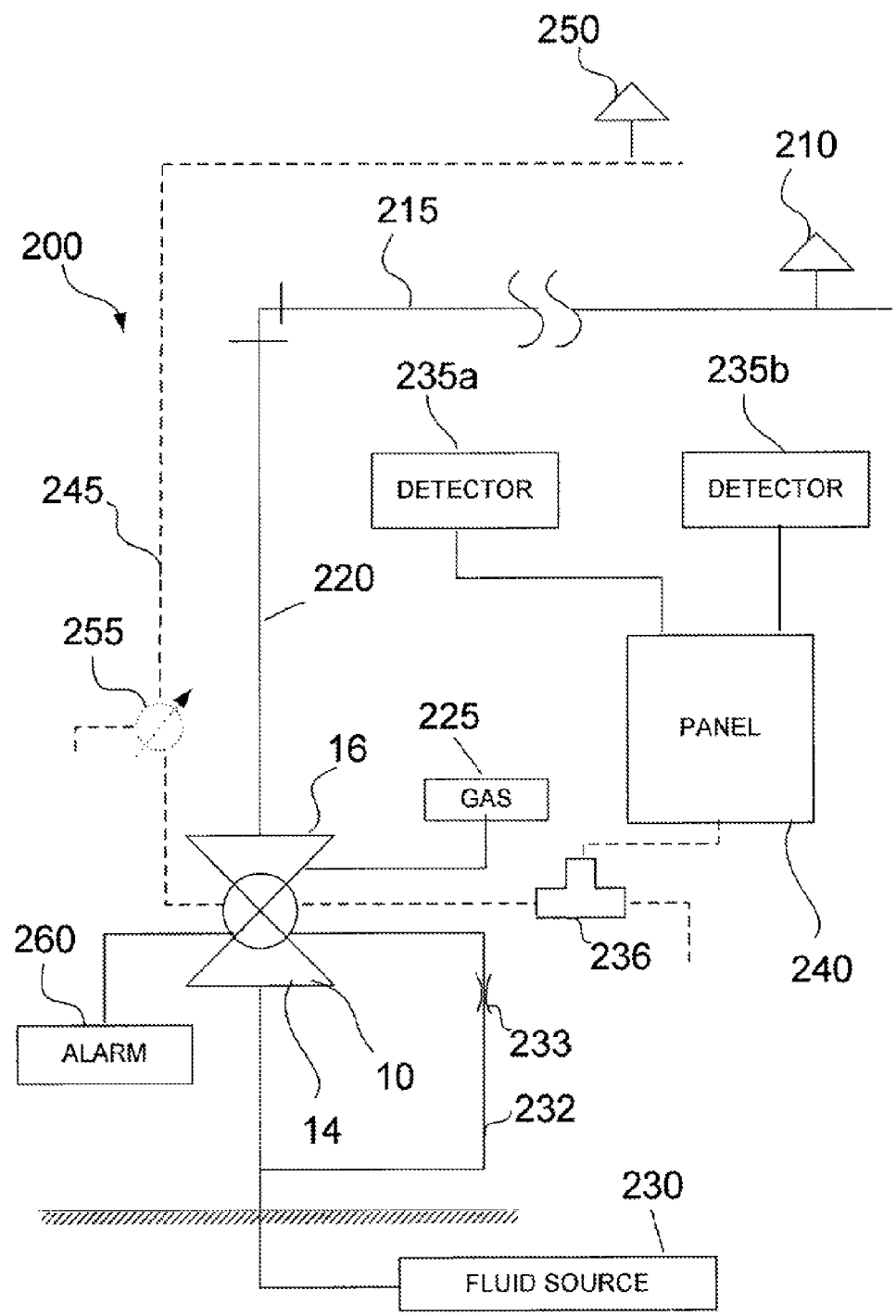
FIG. 7 is a schematic view of another preferred installation of the control valve of FIG. 1.

Accordingly, the control valve 10 can be installed in a preaction fire protection system with its outlet 16 in communication with a riser pipe that is coupled to a network of sprinklers interconnected by pipes and pressurized by the compressed gas or air. More specifically, the control valve 10 can be installed in any one of the preaction fire protection systems shown and described in U.S. Provisional Patent Application No. 60/887,040 without the need for a check valve located downstream of the valve 10. Schematically shown in FIG. 7 is the preferred control valve 10 installed in a preaction fire protection system 200. In addition to the control valve 10, the preaction system 200 includes a piping network of one or more fire protection devices such as, for example, fire protection sprinklers 210 distributed along a feed main 215 in accordance with one or more fire sprinkler installation standards, such as for example, National Fire Protection Association (NFPA) publication, "NFPA 13: Standard for the Installation of Sprinkler Systems" (2007).

In accordance with the preferred installation described above, the control valve 10 is installed in the fire protection system with its outlet coupled to the network of sprinklers 210 and feed main by a riser pipe 220. A compressed gas or air source 225 is placed in controlled communication with the input opening 20 for pressurizing the network of sprinklers with supervisory air or gas preferably ranging from about 8-12 psi. and more preferably about 10 psi. Alternatively, the preferred control valve 10 can be installed in a deluge fire protection system in which the network of sprinklers is open to atmosphere. The inlet 14 of the control valve 10 is preferably placed in controlled communication with a preferred liquid supply source such as, for example, a water main 230. Accordingly, the control valve 10 is installed such that the "wet" or liquid portion of the system is at the inlet side of the valve 10 and the "dry" or gas portion of the system is on the outlet side of the valve 10. The control valve 10 and the system 200 can be placed into service in a manner as described above such that the diaphragm member 100 provides controlled sealed communication between the water main 230 and the network of sprinklers 210. Moreover, the diaphragm can be brought to the sealed position by the introduction of the fluid, preferably appropriately piped and trimmed from the fluid source 230 through an appropriate restriction 233, into the diaphragm chamber 24c, and each of the inlet and outlet chambers 24a, 24b can be brought to pressure by respective introduction of water into the inlet 14 and compressed air into the outlet 16. More preferably, the diaphragm 100 is held in its sealed position with the inlet chamber 24a under static pressure from the water such that the sealing pressure and the static water pressure define the preferred ratio of P1:P2 substantially equal to about 1:1.2. Because the preferred control valve 10, upon seating in the sealed position, forms the intermediate chamber 24d to act as an air seat, the outlet chamber 24b and the network of normally closed sprinklers define a closed system in the preaction system in which incoming compressed air can fill the riser 220 and the main feed 215 and provide supervisory air to the network of sprinklers at the preferred pressure without the use of a check valve anywhere downstream of the valve 10. Accordingly, between the outlet chamber 24b of the control valve 10 and the network of sprinklers 210 a single and preferably substantially constant air pressure can be defined equivalent to the supervisory air of the system 200.

The system 200 can be configured for single or double interlock operation of the control valve 10. Furthermore, the operation of the control valve 10 can be electrically, pneumatically, hydraulically actuated or a combination thereof. For example, the system 200 can be configured as a single interlock system having a detector 235a for detection of heat or smoke to send a detection signal, preferably through a control panel 240, to a solenoid valve 236, vented to atmosphere, that releases water from the diaphragm chamber 24c for actuation of the control valve 10 as discussed above. The detector 235a can be any one of a heat sensitive thermostat, smoke detector or electric manual pull station. Alternatively, the system 200 can be configured as a single interlock system having a dry pilot for actuation of the control valve 10. More specifically, the system 200 can include a dry pilot line 245 that is pneumatically pressurized having one or more pilot sprinklers 250 acting as heat detectors disposed along the line 245. Upon actuation of the pilot sprinklers 250 in the presence of a fire, the release of pneumatic pressure can be configured to operate a dry pilot actuator 255, vented to atmosphere, which can be coupled to the control valve 10 to release water from the diaphragm chamber 24c. Further in the alternative, the pilot line can be configured as an appropriately installed wet pilot line pressurized with water and coupled to the diaphragm chamber 24c. Actuation of the pilot sprinkler 250 in the presence of a fire releases water from the wet pilot line 245 and from the diaphragm chamber 24c for operation of the control valve 10.

Any one of the above single interlock systems can be alternatively configured as a double interlock system. For example, the system 200 can be configured as a double interlock system having a detector 235a for detection of heat or smoke to send a detection signal and a second detector 235b for detecting low air pressure in the network of sprinklers 210. Each of the detectors 235a, 235b can be coupled to a releasing panel in which actuation of each of the detectors is required to operate the releasing panel to release water from the diaphragm chamber 24c and operate the control valve 10. Alternatively, the system 200 can be configured as a double interlock system having a dry pilot and an electrical interlock for actuation of the control valve 10. More specifically, the system 200 can include a dry pilot line 245 that is pneumatically pressurized having one or more pilot sprinklers 250 acting as heat detectors disposed along the line. Upon actuation of the pilot sprinklers 250 in the presence of a fire, the release of pneumatic pressure can be configured to operate a dry pilot actuator 255. To operate the control valve 10 the system can incorporate the heat detector for energizing a solenoid valve that in series with the dry pilot actuator 255 operates the control valve 10. In the alternative, the pilot line of the double interlock system can be configured as a wet pilot line pressurized with water and coupled to the diaphragm chamber 24c. Any one of the above preaction systems preferably includes an alarm connected to the alarm port 22 of the control valve 10 in order to detect the flow of fluid upon actuation of the control valve 10. Further in the alternative, the control valve 10 can be installed in a non-interlock preaction fire protection system.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of pressurizing a chamber in a fluid control valve having a diaphragm member, the method comprising:
   increasing an angle between a plane defined by a perimeter of an annular base portion and a radial projection extending inwardly from the annular base portion, the radial projection disposed within an internal chamber of the fluid control valve to abut an upper surface of the diaphragm member;
   seating the diaphragm member to form a gas chamber axially spaced from a liquid supply chamber;
   forming a gas seat between the gas and liquid chambers;
   decreasing the angle between the plane and the radial projection; and
   disengaging the diaphragm member from a surface of the chamber, the increasing of the angle being about a first pivot point and the decreasing of the angle being about a second pivot point that is different from the first pivot point.

2. The method of claim 1, further comprising:
   sliding a free end of the radial projection against the diaphragm member upper surface.

3. The method of claim 1, wherein seating the diaphragm member includes defining a concave upper surface and a convex lower surface of the diaphragm member.

4. A method of pressurizing a chamber in a fluid control valve having a diaphragm member, the method comprising:
   increasing an angle between a plane defined by a perimeter of an annular base portion and a radial projection extending inwardly from the annular base portion, the radial projection disposed within an internal chamber of the fluid control valve to abut an upper surface of the diaphragm member;

seating the diaphragm member to form a gas chamber axially spaced from a liquid supply chamber;

forming a gas seat between the gas and liquid chambers;

decreasing the angle between the plane and the radial projection; and disengaging the diaphragm member from a surface of the chamber, the increasing of the angle and the decreasing of the angle being about a pivot point that moves when the radial projection transitions between a depressed position and a deflected position of the radial projection.

5. The method of claim 4, further comprising:

sliding a free end of the radial projection against the diaphragm member upper surface.

6. The method of claim 4, wherein seating the diaphragm member includes defining a concave upper surface and a convex lower surface of the diaphragm member.

7. A fluid control valve comprising:

a valve body having a first inner surface defining a chamber having a first axis and a second axis substantially perpendicular to the first axis, the chamber including an inlet and an outlet in communication with the chamber and substantially aligned along the first axis, the inner surface including an elongated seat member substantially aligned along the second axis, the seat member defining a groove, a portion of the body further defining a port in communication with the groove;

a diaphragm member disposed within the chamber for controlling communication between the inlet and the outlet, the diaphragm member having an upper surface and a lower surface, the lower surface including at least a pair of spaced apart elongated members defining a channel therebetween, the diaphragm member having a first position permitting communication between the inlet and the outlet and a second position wherein the elongated members engage the seat member such that the channel is in communication with the groove to define an intermediate chamber in communication with the port; and a depression member disposed within the chamber for moving the diaphragm member into the second position, the depression member having an annular base portion and a plurality of radial projections extending inwardly from the base portion, each radial projection having an arcuate portion with a mounting end and an opposing free end and having a resilient portion disposed between the mounting end and the base portion, the resilient portion defining a pivot point about which the radial projection pivots when moving the diaphragm member into the second position, wherein when the diaphragm member is in the second position, the upper surface defines a substantially concave surface and the lower surface defines a convex surface, the resilient portion of each radial projection of the depression member having an increasing angle with a plane defined by the annular base portion and a decreasing angle with the plane wherein any one of: (i) the increasing of the angle being about a first pivot point and the decreasing of the angle being about a second pivot point that is different from the first pivot point; or (ii) the increasing of the angle and the decreasing of the angle being about a pivot point that moves when the radial projection transitions between a depressed position and a deflected position of the radial projection.

8. The fluid control valve of claim 7, wherein the elongated members define a substantially tapering cross-sectional area.

9. The fluid control valve of claim 7, wherein the diaphragm member defines a central axis substantially perpendicular to the first and second axes, wherein further each of the elongated members includes an angled surface relative to the central axis extending from the lower surface of the diaphragm member to define a sidewall surface of the channel.

10. The fluid control valve of claim 7, wherein the seat member defines a curvilinear surface having an arc length for engaging the lower surface of the diaphragm member, the groove extending along the curvilinear surface for substantially the entire arc length.

11. The fluid control valve of claim 7, wherein the valve body includes an input opening and a fluid drain opening disposed about the seat member, the input opening being in communication with the outlet and the fluid drain opening being in communication with the inlet.

12. The fluid control valve of claim 7, wherein the valve body defines a central axis substantially perpendicular to the first and second axes, the port being substantially aligned with the central axis.

13. The fluid control valve of claim 7, the free end of each radial projection being in sliding engagement with the diaphragm member upper surface.

14. The fluid control valve of claim 7, the resilient portion having a depressed position in which the diaphragm member is in the second position and having a deflected position in which the resilient portion is reversibly deformed, the arcuate portion remaining undeformed when the resilient portion moves between the depressed and deflected positions.

15. The fluid control valve of claim 7, the annular base portion including an inwardly-facing surface, the plurality of radial projections being distributed equidistantly about the inwardly-facing surface.

16. The fluid control valve of claim 7, each of the radial projections having a width along a length of the arcuate portion, the width varying along the length of the arcuate portion.

17. The fluid control valve of claim 7, the annular base portion having a perimeter defining a plane, the resilient portion extending from the base portion to dispose the arcuate portion at an angle to the plane to define a depression angle between the arcuate portion and the plane, the resilient portion having a depressed position defining a first depression angle and a deflected position defining a second depression angle, the first depression angle being greater than the second depression angle.

18. The fluid control valve of claim 7, the annular base portion including an inwardly-facing surface, the plurality of radial projections being four or eight radial projections distributed equidistantly about the inwardly-facing surface.

19. A fluid control valve comprising:

a valve body having a first inner surface defining a chamber having a first axis and a second axis substantially perpendicular to the first axis, the chamber including an inlet and an outlet in communication with the chamber and substantially aligned along the first axis, the inner surface including an elongated seat member substantially aligned along the second axis;

a diaphragm member disposed within the chamber for controlling communication between the inlet and the outlet, the diaphragm member having an upper surface and a lower surface, the lower surface including at least one elongated member, the diaphragm member having a first position permitting communication between the inlet and the outlet and a second position wherein the at least one elongated member engages the seat member; and a depression member disposed within the chamber for moving the diaphragm member into the second position, the depression member having an annular base portion and a plurality of radial projections extending inwardly from the base portion, each radial projection having an arcuate portion with a mounting end and an opposing free end and having a resilient portion disposed between the mounting end and the base portion, the resilient portion defining a pivot point about which the radial projection pivots when moving the diaphragm member into the second position, wherein when the diaphragm member is in the second position, the upper surface defines a substantially concave surface and the lower surface defines a convex surface, the resilient portion of each radial projection of the depression member having an increasing angle with a plane defined by the annular base portion and a decreasing angle with the plane wherein any one of: (i) the increasing of the angle being about a first pivot point and the decreasing of the angle being about a second pivot point that is different from the first pivot point; or (ii) the increasing of the angle and the decreasing of the angle being about a pivot point that moves when the radial projection transitions between a depressed position and a deflected position of the radial projection.

20. The fluid control valve of claim 19, wherein the at least one elongated member defines a substantially tapering cross-sectional area.

21. The fluid control valve of claim 20, wherein the cross-sectional area tapers narrowly from the lower surface of the diaphragm member to a terminal surface.

22. The fluid control valve of claim 21, wherein the terminal surface includes at least one radius of curvature.

23. The fluid control valve of claim 19, wherein the diaphragm member defines a central axis substantially perpendicular to the first and second axes, wherein at least one elongated member includes an angled surface relative to the central axis extending from the lower surface of the diaphragm member to define a sidewall surface of the channel.

24. The fluid control valve of claim 23, wherein each of the angled surfaces defines an angle of about forty-five degrees relative to the central axis.

25. The fluid control valve of claim 19, wherein the valve body further includes a first brace member and a second brace member, the first and second brace members being disposed about and engaged with the seat member.

26. The fluid control valve of claim 25, wherein the first and second brace members bisect the chamber along the first axis, and the seat member bisects the chamber along the second axis.

27. The fluid control valve of claim 25, wherein the first and second brace members are integrally formed with the seat member.

* * * * *